US009459938B1

(12) United States Patent
Denton et al.

(10) Patent No.: US 9,459,938 B1
(45) Date of Patent: Oct. 4, 2016

(54) PERSONAL TREND MANAGEMENT

(75) Inventors: Aaron Denton, Glendale, AZ (US);
Shane T. Lunceford, San Jose, CA (US)

(73) Assignee: TrendMe, Inc., Chandler, AZ (US)

( * ) Notice: Subject to any disclaimer, the term of this patent is extended or adjusted under 35 U.S.C. 154(b) by 1372 days.

(21) Appl. No.: 12/964,596

(22) Filed: Dec. 9, 2010

(51) Int. Cl.
G06F 17/30 (2006.01)
G06F 9/54 (2006.01)
G06F 17/18 (2006.01)

(52) U.S. Cl.
CPC ............. *G06F 9/542* (2013.01); *G06F 17/18* (2013.01)

(58) Field of Classification Search
CPC .................................. G06F 9/542; G06F 17/18
USPC ......................................................... 707/740
See application file for complete search history.

(56) References Cited

U.S. PATENT DOCUMENTS

| 7,930,411 B1* | 4/2011 | Hayward ...................... 709/229 |
| 2003/0009399 A1* | 1/2003 | Boerner .................. G06F 17/18 705/35 |
| 2006/0007901 A1* | 1/2006 | Roskowski et al. .......... 370/338 |
| 2007/0061393 A1* | 3/2007 | Moore .......................... 709/201 |
| 2007/0073717 A1* | 3/2007 | Ramer ............. G06F 17/30864 |
| 2009/0172773 A1* | 7/2009 | Moore ............................. 726/1 |
| 2009/0240586 A1* | 9/2009 | Ramer et al. .................. 705/14 |
| 2011/0264663 A1* | 10/2011 | Verkasalo ..................... 707/740 |

* cited by examiner

Primary Examiner — Aleksandr Kerzhner
Assistant Examiner — Sabana S Rahman
(74) Attorney, Agent, or Firm — Hickman Palermo Becker Bingham LLP

(57) ABSTRACT

A method and apparatus for personal trend management is provided. A request is received to associate a template with a user. The template includes instructions that define one or more data analysis strategies. Data associated with a data collection device that includes time stamped events associated with the user is received. Based on a strategy defined in the template and the data received from the data collection device, a result that conveys information relating to one or more trends involving the events is generated.

4 Claims, 4 Drawing Sheets

PERSONAL TREND MANAGEMENT

FIELD OF THE INVENTION

The present invention relates to personal trend management systems.

BACKGROUND

Consumers have a variety of data collection devices (collection devices) at their disposal. These devices collect information that can be associated with the user of the device. For example, a digital pedometer such as the Nike+ device may be used to keep track of the number of steps a user has taken. Data collection devices also include devices that receive manual input from users. For example, a user may press a button on a device each time he smokes a cigarette to track his smoking habit.

The number of devices that collect information about individuals is rising, fueled by the declining cost of technology and the growing desire for personalized information. Mobile devices such as mobile phones, personal digital assistants, and health monitoring devices often remain with their owners throughout the entire day. More traditional devices such as televisions, cameras, and even refrigerators have become "connected" devices capable of tracking information and sending that information over a network. Even non-connected devices are being retro-fitted to become network-enabled, using "smart" electrical outlets that track energy for each appliance and upload the resulting data to a system capable of presenting the data in a useful way.

Data collection devices that are directed to consumers with a desire to collect data about themselves are often sold with software that allows the user of the device to perform some level of analysis and reporting related to the data collected by the device. Rather than distribute software with each device, manufacturers of other data collection devices provide websites for the user to visit. Users of the Internet often "register," or create "accounts" with a variety of web sites by generating unique identifiers such as user names. By registering with a web site, a user becomes uniquely identifiable to the web site, allowing the user to create, request and receive personalized content. Users may log in to each web site in order to view this personalized content. Such websites often provide a password-protected interface that allows the user to view and manipulate the data collected by the associated data collection device.

Although the hardware required to track information about individuals is inexpensive, the requirement that the manufacturer of the data collection device create a software application or website that allows the user to view a meaningful interpretation of the data creates barrier to entry for would-be data collection device manufacturers. Manufacturers may raise the cost of the device to help mitigate the costs of offering a free web-based service, or may charge an ongoing separate fee for the service.

One example of a data collection device that relies on a web-based service is the Fitbit. The Fitbit includes an accelerometer that tracks the motion of the person wearing the device. An accelerometer is a small, inexpensive electromechanical device that measures acceleration forces. The constant force of gravity or forces caused by moving may be measured using an accelerometer. Measuring constant gravitational forces even allows data collection devices to sense the angle at which the device is tilted with respect to the earth. The Fitbit uses the accelerometer to generate motion data, and uploads the data to a server that is used to determine sleeping habits, activity levels, and other information based on the data.

The ability to analyze data collected by each device is limited by the capabilities of the associated software or website. Although some data collection devices offer access to the raw data gathered by the device, the users of these devices are often not well-equipped to analyze the data in a meaningful way that is different from the general analysis available through the manufacturer's website. However, the manufacturer's website may not provide the level of user-customization or the type of analysis desired by the user.

In addition, most websites limit the amount of control that users have over customization of reporting, and many assumptions are made by the reporting tools to allow the reports to work for the largest number of people. The ability to perform a detailed personal analysis of collected data is sacrificed in favor of broad coverage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
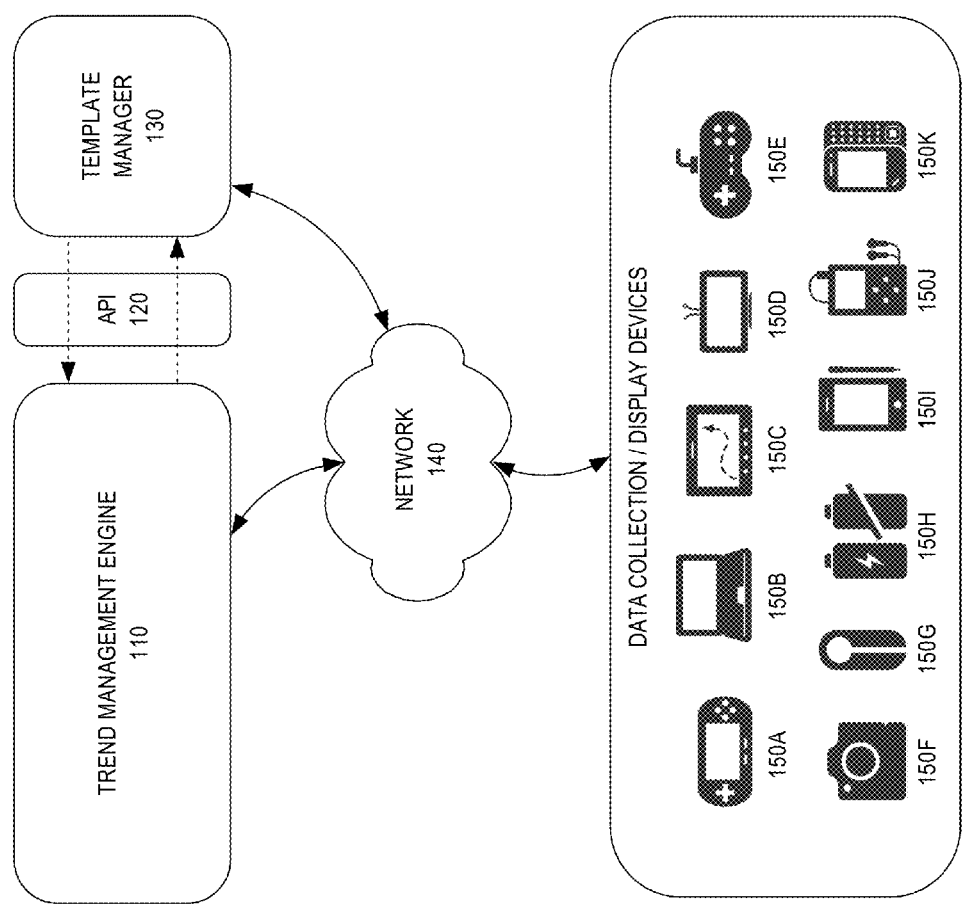
FIG. 1 illustrates a block diagram of an environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Users of data collection devices are often interested in an analysis of the information gathered by the devices, particularly if that information tells them something useful or interesting about themselves. For example, users may wish to be aware of trends that may be identified through the use of data collection devices. A trend is a tendency or an inclination in a particular direction. The tendency shown by a trend may occur over a period of time or within a particular space. For example, a user may have a tendency to smoke more cigarettes at work than at home. However, a trend that a user is interested in may not be available via the website or software provided by the manufacturer of the data collection device that gathers the data from which the trend may be deduced. Consequently, techniques are provided herein that allow users to send data from many different data collection devices to a trend management system, and to have that data analyzed based on templates.

Users are no longer limited to analyzing data collected by a data collection device only using methods provided by the manufacturer. Users can combine data from multiple data collection devices and analyze the data gathered by each device using context provided by the other device, even if the devices are unaware of each other.

Because the analysis is performed by the trend analysis system based on templates, and the templates may be developed by sources other than the data collection device manufacturers, the data collection device manufacturers need not develop and maintain their own analysis software. Consequently, the overhead associated with providing a data collection device is reduced, resulting in less expensive data collection devices. Device manufacturers can build devices that collect relevant data, and rely on third parties to determine the best ways to analyze the data collected from the device. Also, developers of data analysis strategies may find new ways to use the data gathered from existing devices.

In addition, because the trend management system is able to receive data from multiple types of data collection devices, a single template may make use of multiple types of data gather from multiple types of data collection devices to find trends that would not be discoverable based on the data of only one of the data collection devices.

Registering with a Trend Management System

As mentioned above, techniques are provided in which data gathered for a single user from multiple types of data collection devices may be sent to a single trend management system. According to one embodiment, the user creates an account on a website or other interface that is connected to a personal trend management system. The user then registers a particular data collection device, such as a Fitbit, with his account. Registration includes providing a username and password to a data source that stores data from the data collection device, configuring the device to send data to the personal trend management system, or any other steps required to make data generated by the data collection device available to the personal trend management system.

In an embodiment, users may register a large quantity and variety of data collection devices with the account with the personal trend management system. The data collection devices that are registered with the personal trend management system include specific hardware data collection devices and/or virtual data collection devices that are not hardware specific. For example, a user may register a Facebook account with the system as a virtual data collection device that may collect information about the user via a smartphone, personal computer, or other means.

In an embodiment, each data collection device that is registered with the personal trend management system is associated with one or more event categories, which define the type of events generated by the data collection device. For example, the Nike+ device and the Fitbit device are both capable of collecting event data that describes the distance travelled by the user of the device. Consequently, the Nike+ device and the Fitbit device are both be registered as devices that belong to a "Distance Travelled" category. As another example, only certain iPhones and Android phones may have global position detection capabilities. Only those phones with global position detection capabilities would be associated with location events (being at a particular place at a particular time), and therefore belong to a "Location" category.

Within the personal trend management system, each data collection device may be defined by the actual model number of the device, or may be based on the software capabilities of the device, or category of the device.

Template Overview

According to one embodiment, templates that define data analysis strategies may be available to users to help users analyze the data collected on their behalf. Templates may define the use of data from more than one data collection device to generate a useful presentation for the user. For example, location data may be gathered from the user's mobile telephone and heart-rate data may be gathered from the user's mobile heart-rate monitoring device. A template may (a) allow the user to define the location parameters that identify the user's place of work and the user's home, and (b) implement a data analysis strategy that correlates the user's heart rate with those two locations. Using such a template, a user may obtain a data presentation from the personal trend management system that shows, for example, that the user's heart-rate is much higher at work than it is at home. Users may use any template on the system, as long as the user has a device that generates the type of events used by the template.

Trend Categories

In an embodiment, users can customize their experience by placing templates into a hierarchy of templates, which is organized in terms of trend categories. Each template may be placed into one or more trend categories. Trend categories may also have, as child nodes, other trend categories.

For example, one level of the hierarchy may have three trend categories: "body 311," "mind 312," and "heart 313." The body trend category 311 may include templates that measure exercise and nutrition. There may even be an "exercise" trend category 314 under the "body" trend category 311, and may include several exercise-specific templates 323 and 324.

In one embodiment, a score is generated for each template in each trend category based on the data collected for a given user. Further, based on the scores of the templates associated with each trend category, a score is generated for each trend category for the given user. In generating the score for a given trend category, a weight is be assigned to each template in the trend category. The weight associated with each template in a trend category may be based, for example, on the degree to which the strategy of each template is reflected in a trend category.

A user uses trend categories to define the importance of each template. For example, a user may want to generate scores that indicate a level of success or accomplishment for each of the three trend categories: "body 311," "mind 312," and "heart 313." In one embodiment, scores are generated for the user for the templates that belong to the trend categories, and a score is then generated for each node in the trend hierarchy. A composite report is then generated for each of the "body 311," "mind 312," and "heart 313" trend categories based on the child nodes (trend category and templates) of each trend category and the weight of that child node.

For example, the user may have a score of 86% from an exercise-related template and a score of 50% from a nutrition-related template. The user may have assigned a weight of 40% to the exercise-related template and a weight of 60% to the nutrition-related template. The "body" trend category 311 may then be assigned a score that is based on these scores and weights. For example, the score for the "body" trend category may be determined by the following formula: $(86)(0.4)+(50)(0.6)=64.4\%$. Performing this analysis for each trend category, a success score is generated for each trend category that the user deems important, in the way outlined by the user. The user is able to quickly determine which portions of his life are out of balance based on the events generated by data collection devices.

The Trend Management System Environment

FIG. 1 illustrates a block diagram of an environment in which a trend management system may be implemented, according to an embodiment. Referring to FIG. 1, the environment generally includes data collection devices 150A-150K, a trend management engine 110, and a template manager 130, all of which are coupled to a network 140.

In the embodiment illustrated in FIG. 1, data collection devices include a personal gaming system 150A, a general or special purpose computer 150B, a global positioning system (GPS) device 150C, a television (or advanced television) 150D, a gaming console or controller 150E, a camera 150F, a motion tracking device 150G, a smart battery system 150H, a personal digital assistant (PDA) 150I, a personal audio player 150J, or a telephone or mobile phone such as smart phone 150K. However, these are merely examples of devices that are able to collect data. Other data collection devices may be used. For example, automobiles are data collection devices that collect data which may be accessed via an interface such as an ODBCII interface, Bluetooth interface, modem or other interface. Automobiles may also include data collection devices such as sensors, entertainment systems, climate control systems, and other devices. Data collection devices which have not yet been conceived may be used in a future embodiment. The techniques described herein are not limited to any particular type of data collection devices.

A data collection device, such as GPS device 150C, collects event data, such as time-stamped location data. The data collection device sends the event data to the trend management engine 110. Trend management engine 110 processes the data and generates reports and other output which may be viewed by the user of the data collection device. The output may be sent to the data collection device that generated the data, or to another device such as computer 150B.

A template manager 130 is coupled to trend management engine 110 via an application programming interface (API) 120. Template manager 130 may be included in trend management engine 110, or may be separate from trend management engine 110, as shown in FIG. 1. Templates that include instructions for trend management engine 110 are stored in a database or other storage facility associated with template manager 130. Templates are based on an application programming interface (API), such as API 120 in an embodiment. Instructions in templates instruct trend management engine 110 on how to interpret and analyze data, display results, and collect information in an embodiment. These instructions are interpreted by trend management engine 110.

The Trend Management Engine

Figure 2:
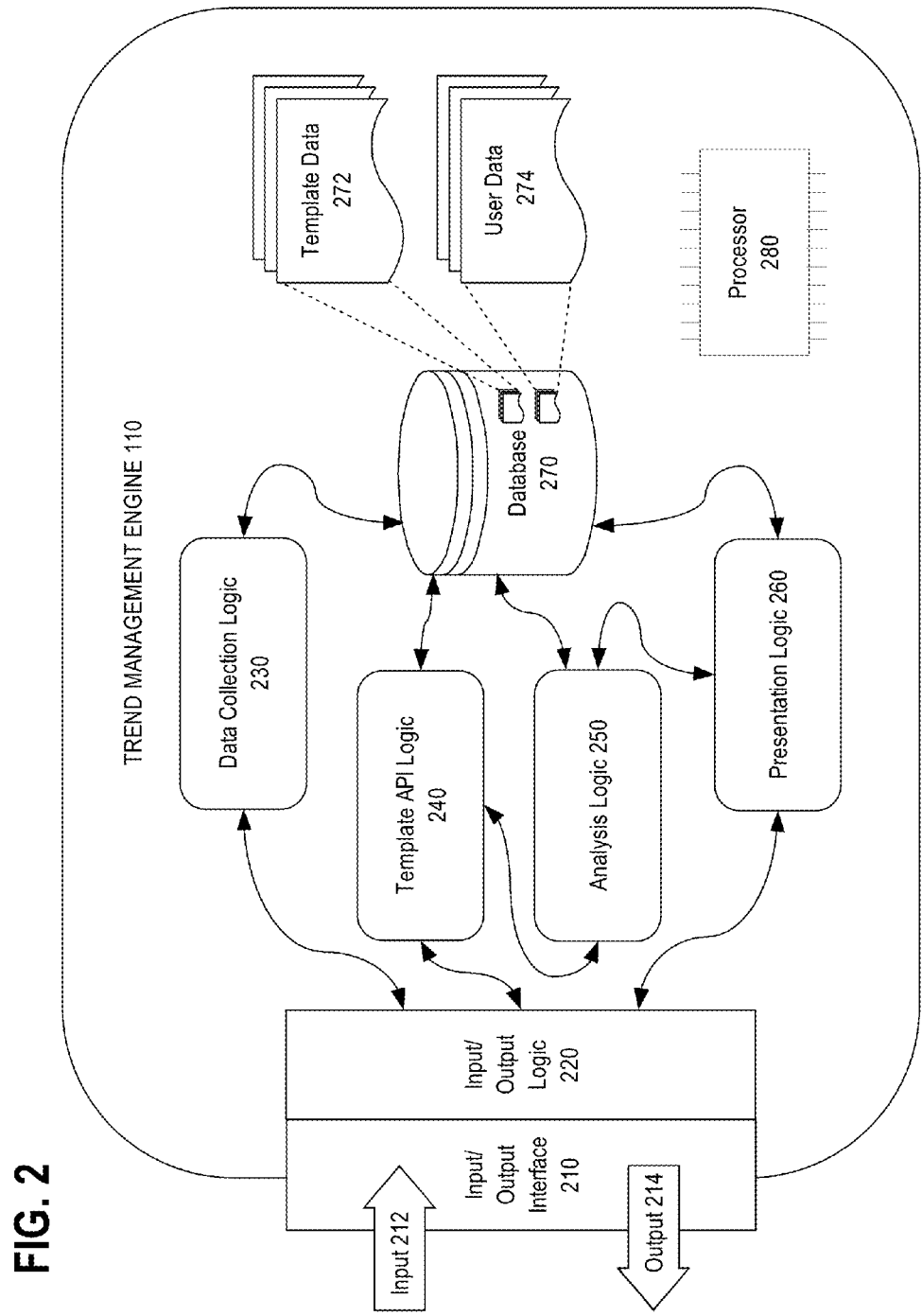
FIG. 2 illustrates a block diagram of an environment in which an embodiment may be implemented.

FIG. 2 is a block diagram that illustrates trend management engine 110 of FIG. 1 in greater detail, according to an embodiment. Referring to FIG. 2, an input 212 is received by the trend management engine 110 at an input/output (IO) interface 210. IO interface 210 may be a network interface such as a Bluetooth or Ethernet-based interface. Input 212 may include event data received from a data collection device, such as television 150D.

An IO logic 220 is coupled to IO interface 210. IO logic is configured to parse and distribute incoming data and prepare output 214 for sending via IO interface 210, according to an embodiment. IO logic 220 may implement one or more communications protocols. IO logic 220 is coupled to a data collection logic 230, a template API logic 240, and a presentation logic 260, in an embodiment. IO logic 220 is also coupled to a database 270, in an embodiment.

A data collection logic 230, template API logic 240, an analysis logic 250, and presentation logic 260 are all coupled to database 270, in an embodiment. Database 270 may include template data such as template data 272 and user data such as user data 274 in an embodiment. IO logic 220, data collection logic 230, template API logic 240, analysis logic 250, presentation logic 260, and database 270 are all coupled to a processor 280, which executes instructions provided by these elements of trend management system 110.

In an embodiment, event data from a data collection device, such television 150D, is received as input 212 to trend management engine 110 via IO interface 210. IO interface 210 provides input 212 to IO logic 220, which is configured to convert input 212 into data which the trend management engine 110 is capable of utilizing. The resulting data is forwarded to data collection logic 230. Data collection logic 230 converts the data or normalize the data to conform to a format that is consistent with other data of the same kind that is associated with trend management engine 110 before storing the data in database 270. For example, the data may be location data received from a GPS device. However, many GPS devices exist, and these devices may report data differently, using different variable names, time intervals, or measurement systems. In an embodiment, a standard data format for location data is defined within trend management engine 110, and data collection logic 230 converts all location data to this standard format.

In an embodiment, input 212 is a request to view a report associated with previously collected data about a user. Input 212 is converted into a request message and delivered to presentation logic 260. Presentation logic 260 may retrieve a previously saved report from a table in database 270 and provide the report as output 214. Presentation logic 260 may include one or more web servers, and may provide output 214 via a web interface. In an embodiment, the request message is forwarded to analysis logic 250. Analysis logic 250 uses stored instructions that define a data analysis strategy to generate a report. Analysis logic 250 retrieves these instructions from templates or from data storage. Analysis logic 250 interprets and executes the instructions based on stored routines that are associated with the instructions. For example, a stored routine may define a general regression analysis and possible variables. The stored instructions may provide the variables and options required to perform a specific regression analysis. Analysis logic 250 may employ external data analysis tools such as Apache Hadoop to facilitate the analysis of large amounts of data.

The instructions that define a data analysis strategy are stored in database 270 or other storage medium in an embodiment. The instructions that define the data analysis strategy may be stored in a storage system associated with template manager 130 in the form of a template. Analysis logic 250 receives instructions from a template via template API logic 240. These instructions may be stored in database 270, or may be cached. Alternatively, instructions may be requested as needed from template manager 130.

In an embodiment, template API logic 240 is configured to generate instructions for analysis logic 250 by parsing commands or tags stored in templates. These commands or tags may be based on a markup language such as XML, or may include program code based on a programming language such as PHP, Perl, C++, or any other programming language.

In an embodiment, input 212 includes a request to register a custom template with trend management engine 110. Template API logic 240 receives the data from this request via IO logic 220. Template API logic 240 validates the template associated with the request based on security criteria or other criteria such as error-checking and data availability criteria. Once the template is validated, template-specific metadata, such as version information and data requirements may be stored in the template data table 272 and the template may be stored in template manager 130. In an embodiment, input 212 includes a request to register a user or user-specific data with trend management engine 110. Data collection logic 230 stores this data in the user data table 274 of database 270.

In an embodiment, a template may include instructions for a data collection device. For example, a template may require data to be entered manually using a smartphone such as smartphone 150K. These instructions are stored in template data table 272. When a request to associate that template with a particular device is received, template API logic 240 may send a request to the device with the instructions to generate a data entry interface. The device may natively support these instructions, or may require an application compatible with template management engine 110 to be installed in order to support the instructions.

Data Collection Devices

A data collection device is a device that collects information associated with one or more users of the device. For example, personal gaming system 150A, gaming console or controller 150E may collect information about when a user plays a game, high score information, duration of play, and other information. Computer 150B may collect manual entry data, web surfing habits, telephone (including Voice over IP) or email tracking information, and other application information. GPS device 150C may collect geo-location data and associate this location data with restaurants, stores, and other points of interest. In an embodiment, GPS device 150C is a smartphone such as an iPhone. Television 150D or a set-top box, digital video recorder (DVR), audio player, remote control, or other home entertainment device may track media viewing, listening, and interaction habits. For example, a set-top box may keep track of television channels watched, and Television 150D may track power consumption and viewing time. Camera 150F may keep track of pictures and videos taken, location data, and any information entered manually by the user of the camera 150F. Motion tracking device 150G, such as a Fitbit, may track movement information. Smart battery system 150H may track power consumption. Personal digital assistant (PDA) 150I may track application usage, calendar items, location information, and more. Personal audio player 150J or another type of personal media player such as a personal video player may track the amount of time spent listening to a particular song or watching a particular movie. Data collection devices that are virtual data collection devices are not hardware specific, but may be associated with a website such as Facebook or Linkedin. These data collection devices may track usage of the website, messaging information, and other statistics associated with the functionality of the website. A telephone or mobile phone such as smart phone 150K may track location information, manually entered information, application specific information, contact information, messaging information such as texting data, email data, ambient light data, movement data, and other information. All of these data collection devices may collect timestamp data. Although a variety of data collection devices have been listed to convey the diversity of the types of data collection devices that may be used, any data collection device may be used in conjunction with trend management engine 110, and the examples listed herein are not limiting examples. For example, healthcare monitoring devices, automobile sensors, household electronics, smart-grid systems, toys, and electronic book readers all may collect data, and therefore are data collection devices.

In an embodiment, a data collection device is registered with trend management engine 110. To register a data collection device with trend management system 110 is to make trend management system 110 aware of the device. Each data collection device that is registered with the personal trend management system is associated with one or more event categories, which define the type of events generated by the data collection device. The registration process may include, for example, providing a unique device identifier associated with the data collection device to trend management system 110. A mapping between the device and the event categories for which the device is capable of collecting data may be stored in in a device-event matrix. In addition, a mapping between the device and the user requesting the device registration may be stored in the form of a device identifier to user identifier record in a database table such as user data table 274. A user ID representing a user may be associated with more than one device in an embodiment.

According to one embodiment, data collection devices generate, store, and report events. Events, as used herein, represent state information associated with time information, such as one or more time stamps. For example, the state of being at a particular place at a particular time may be recorded as an event. Being at the same place at a different time may be recorded as another event. Thus, change only in time is enough to generate an event. However, a change in state may also generate an event. For example, moving a game controller from left to right may cause an accelerometer within the controller to record an event. The event may be described by the change in movement from one direction to another. As another example, having a particular heart-rate at a particular time may be considered an event.

The same type of information (in the same event category) may be recorded by multiple data collection devices. For example, a smartphone and a GPS device may each track location data. One device may be more "trusted" than the other, but the results of these devices may also be compared to detect discrepancies between the devices, and a report that indicates the discrepancies may be generated.

Time stamps may be in the form of immediate time stamps associated with individual events, as discussed above. In another embodiment, time stamps may represent ranges of time. For example, it may be cumbersome to measure each falling raindrop that falls in a collection and measurement system as a separate event. However, one-minute intervals may be marked by time stamps, and the delta of the rain volume from one minute to the next may be reported with the time stamp. Thus, a time stamp may represent multiple actual events, but be associated with a single set of actual events.

Event data may be stored locally on a data collection device before it is transferred to trend management engine 110. For example the data collection device may have volatile or non-volatile memory that is used to store data that is collected over a period of time. Later, when the data collection device becomes connected to a network such as network 140, data collection device may upload event data to remote storage, such as database 270. In an embodiment, event data is uploaded to a third-party storage system, and trend management system 110 is configured to retrieve the event data from the third-party system by using the registration information provided by the user of the data collection device.

Trend Management Engine

Trend management engine 110 collects event data provided by data collection devices, and provides a useful analysis of that data. Trend management engine 110 may be configured to perform any type of analysis technique, and may be used to identify trends associated with events, users, or data collection devices.

Event data received by trend management engine 110 may be grouped into event categories. One event category, for example, may be "location events," since more than one data collection device may be capable of recording location events. This allows trend management engine 110 to perform a data analysis requiring location information using any data in the "location events" event category, rather than requiring that the events be sent from a particular type or model of device. In addition, a pecking order may be configured to specify which set of events comes from the most "trusted" data collection device. For example, one heart-rate monitor may be known to provide more accurate data than another. Thus, if both devices store events in a "heart-rate" event category, the more accurate events will be used for any time span for which it is available.

Data analysis techniques may include data grouping based on time stamps, trend analysis using regression techniques, time series analysis, or any other analysis method. Trend data may be provided to users to help them predict a level of success associated with the data collected by one or more data collection devices. For example, if a user has a goal of creating a calorie deficit in order to lose weight, that user may track calorie intake using an iPhone application and calorie burning using a Fitbit. A regression analysis of events generated by these devices over time will allow the user to determine when, or if, he will meet his weight loss goal.

Trend management engine 110 provides a useful presentation of data collected from data collection devices. Some event data may be perceived in a way that misinforms the user when presented without careful consideration to the context surrounding the event data and the event category in which the event data falls. For example, a user may average eight hours of sleep per night. At first glance, it may appear that this user requires no changes in his sleep habits. However, a closer look may reveal that the user sleeps four hours per night and twelve hours per night on alternating days. By presenting the data in a way that highlights the alternating sleep patterns, such as a line chart, the user may be able to identify patterns in his sleep.

Using time stamps, trend management engine 110 can determine which events occurred within the same time span. For example, a series of events that include location information may be associated with a set of timestamps that occurred within a particular period of time. Another set of events may also be associated with a set of timestamps that occurred within the same period of time. These sets of time stamps, although not necessarily identical to one another, are said to "match" because they occur within the same time period. Matching events based on time stamps allows an analysis to be performed based on the occurrence of an event, rather than continually performing an analysis of data over time. For example, certain events may only be meaningful when they occur at a particular place. A triggering event may include location information that falls within one or more geographic perimeters, or geo-fences. Other events, such as those that track the calorie intake for a user, may then be matched with particular places to determine which places are associated with higher calorie intake. Alternatively, if calorie intake meets a certain threshold over a particular period of time, location events may be matched to that period of time to determine the locations associated with unhealthy behavior.

Data analysis output, such as output 214, may convey information relating to one or more trends. A trend may show the direction in which data has moved, is moving, or is expected to move. For example, a graph showing data points associated with events occurring over time is information relating to a trend. A trend includes any tendencies exhibited by data. Therefore, a map that shows that particular events tend to occur in particular places conveys information relating to a trend. The map need not necessarily include a trend analysis, but the map may allow a user to determine whether or not a tendency exists in the data. Output 214 may be in the form of graphs, charts, textual data, video or other multimedia format, or even executable instructions. Output 214 may be sent to a general purpose computer, data collection device, or any other device that is capable of displaying output 214, such as an Internet-enabled television.

Trend management engine 110 may send instructions to a data collection device. For example, upon determining that a particular type of data is required, trend management engine 110 may instruct a data collection device to begin collecting the required events. In an embodiment, trend management engine 110 determines that a manual data entry interface is required in order to collect the desired events. For example, a user may indicate that he wishes to track his cigarette smoking habit. Trend management engine 110 may instruct smartphone 150K to generate a data entry interface that includes a button which, when pressed, sends an event to trend management engine 110 indicating that the user has smoked a cigarette. The creation of manual data entry interfaces and their components such as buttons, forms, and image upload components may be facilitated by an application residing on smartphone 150K in an embodiment. The application may keep track of event data entered manually, even if smartphone 150K is not connected to network 140. Event data may be stored locally at smartphone 150K, and may be uploaded to trend management engine 110 when connectivity is available. This process is known as "syncing" the data collection device with trend management engine 110. In an embodiment, the instructions for generating a data entry interface are sent to a web browser residing on the data collection device in the form of HTML (hypertext markup language) or another browser-enabled language.

In an embodiment, trend management engine 110 includes a device-event matrix that maps data collection devices to one or more capabilities that describe information about the device, including the event categories of events that the device is capable of tracking. The device-event matrix stores a conservation metric that is associated with an event category or with an event category-to-device mapping. The conservation metric represents how important it is to disable the event tracking functionality associated with a particular event category when that event category is not in use. For example, GPS-based location tracking, when enabled, may significantly decrease the battery life of a smartphone such as smartphone 150K. Therefore, if the data analysis requirements of a particular user do not rely on location data, trend management engine 110 may instruct the user's smartphone to disable GPS-based location tracking in order to preserve battery life. In an embodiment, battery life and resource usage information associated with a data collection device may be sent to trend management engine 110, and this information may be considered when determining whether to instruct the data collection device to disable tracking services for one or more events. The conservation metric may be defined by the user through a user interface in an embodiment. In an embodiment, conservation logic may be implemented using an application that is local to the data collection device.

Templates

Templates may be used to store instructions that define one or more data analysis strategies. Instructions may be stored in XML format or any other language or format understood by API 120. In an embodiment, templates are native to trend management engine 110, and API 120 is not required for interpreting or converting instructions in templates. In an embodiment, API 120 converts instructions that are stored in a template into instructions that may be executed by trend management engine 110. Templates may be stored in database 270. Templates are stored in template manager 130, which includes a database for storing templates and a template management system for managing requests by third parties to make templates available to trend management engine 110.

The instructions stored in each template may include the type of analysis, which variables to use, how to display the data, and time intervals to use. For example, a template may include instructions that specify that a form of regression analysis is to be used for analyzing heart rate and location events that have occurred over the last year, and that a scatter-plot with a regression line is to be displayed. For example, a simple template may include the following instructions:

```
<template>
  <analysis type="regression">
    <variable type="heart_rate"/>
    <predictor_variable type="day_of_year"/>
    <filter type="location">
      Home
    </filter>
    <time days="365"/>
  </analysis>
  <output type="scatter">
    <option="trend_line"/>
  </output>
</template>
```

These instructions direct trend management engine 110 to perform a regression analysis of heart rate data over 365 days. The predictor variable is the day of the year (from 1 to 365), and only heart rate events generated at the user's "Home" location are used in the analysis. A scatter plot with an optional trend line is generated. The day of the year may be used as a predictor, for example, because the user may wish to see if the time of year is an indicator of his heart rate at home. Trend management engine 110 performs the regression analysis, as instructed by the template, and generates a useful presentation of the analysis. A user may notice a trend based on this presentation, such as a monthly trend, which may be associated with the user's payday.

The instructions may also include instructions for generating manual data entry interfaces and their components such as buttons, forms, and image upload components. For example, a button may be defined in XML by a button name and a variable associated with the button, along with an action, as follows: <button name="cigarette" action="increment"/>. Actions may be mapped to standard actions that are stored as template data 272 at trend management system 110 and recognized by trend management engine 110 as "safe" actions in an embodiment. In an embodiment, actions may be defined within a template using a programming language. For example, an increment function may be defined as follows: <function><increment>cigarette=cigarette++; </increment></function>.

A template may have user-specific requirements. For example, a user may want to track a particular type of event, but only when that event occurs at one or more particular locations. A template may include references to standard geo-location labels, such as geo_home or geo_work. In an embodiment, users may be able to select as many locations as they desire and store these locations in the user data table 274. Users may associate particular locations with templates to make those locations available to the chosen templates. In an embodiment, a template may instruct trend management engine 110 to perform a particular analysis based on all locations associated with that template. A template may also require, upon a user request to use the template, that additional locations be configured by the user.

In an embodiment, locations may be configured by visiting a location with a GPS device and entering or selecting a name for the location within a location management application or other interface on the GPS device. In another embodiment, locations may be configured by providing an address of the location to trend management system, which may be converted into geo-location data that is compatible with data generated by GPS devices. In an embodiment, a map interface, on a website, for example, is presented to the user, who may draw a perimeter around a geographic area on the map and select a name for the location encompassed by the perimeter.

Templates may require additional configuration of variables by users, which may be stored in database 270. For example, a template designed to help a user track how many books the user has read may require the user to define a goal. The output 214 associated with the template may be a line graph that shows the average number of books read each month, along with a line that represents the "goal" amount. Success may be determined based on a planned vs. actual analysis. For example, the template may congratulate the user or generate a score for the user based on how close the user is to reading the "goal" number of books.

A template may include logic that defines preferred data collection devices. For example, a template may express a preference for a more accurate GPS device over a less accurate one, but may provide an analysis based on the events gathered from the less accurate GPS device if that is the only data available. In addition, different strategies may be employed depending on which data collection devices are available.

In an embodiment, each template causes trend management engine 110 to produce output 214 in the form of a single score that measures success associated with that template. This output 214 is in addition to other output 214 produced. Using this "success" metric, users may quickly look at the various trends they are tracking through the use of templates, and determine the level of success they are having with respect to each template.

Users may select templates to associate with user accounts via a template management interface. In an embodiment, users may purchase templates. Templates may be suggested to users based on the data collection devices that the user has registered with trend management system 110. For example, if a user has registered a GPS device and a Facebook account with trend management system 110, then a recommendation may be provided to the user for a template that includes a strategy for monitoring Facebook usage at work. In an embodiment, users may recommend templates and data collection devices to one another.

Templates may be unavailable to users that do not have the requisite data collection device(s). For example, a user may not be able to associate a particular template with his account if that template requires a GPS device that the user has not registered with trend management system 110. In addition, users may designate certain event categories as "off-limits." For example, a user may not wish to have his location information tracked. Removing event categories from consideration may render templates requiring events associated with those event categories unavailable to the user. As users make requisite events and devices available through user settings and registration of new devices, additional templates may be made available to the user. For example, if a user registers a heart-rate monitor, a template that was previously unavailable to that user may be made available based on the registration of the new device.

Templates may assist trend management engine 110 with efforts to conserve battery life and other resources associated with data collection devices. If no templates require certain data (GPS data, for example) then it may be desirable to avoid collecting that data. For example, constant collection of GPS data may run the battery of a smartphone down. Alternatively, it may be desirable to collect the data for other reasons. In an embodiment, the way the data is stored may be changed. For example, the data may be stored in a compressed for to conserve storage space. The data may be stored remotely, or may be uploaded only when the data collection device is plugged in if network uploads cause rapid battery depletion. It may be desirable to collect less data under certain circumstances. For example, a data collection device may be instructed to collect GPS events every 10 minutes instead of every 1 minute if that particular device is particularly vulnerable to battery depletion.

In an embodiment, when trend management engine 110 determines that a template is not dependent on a particular set of data, it may instruct a data collection device to perform one of the following: a) stop reporting the data; b) stop collecting the data; c) stop storing the data; d) report the data using a technique other than a default technique for reporting the data; e) collect the data using a technique other than a default technique for collecting the data; f) store the data using a technique other than the default technique for storing the data.

Composite Reporting

Figure 3:
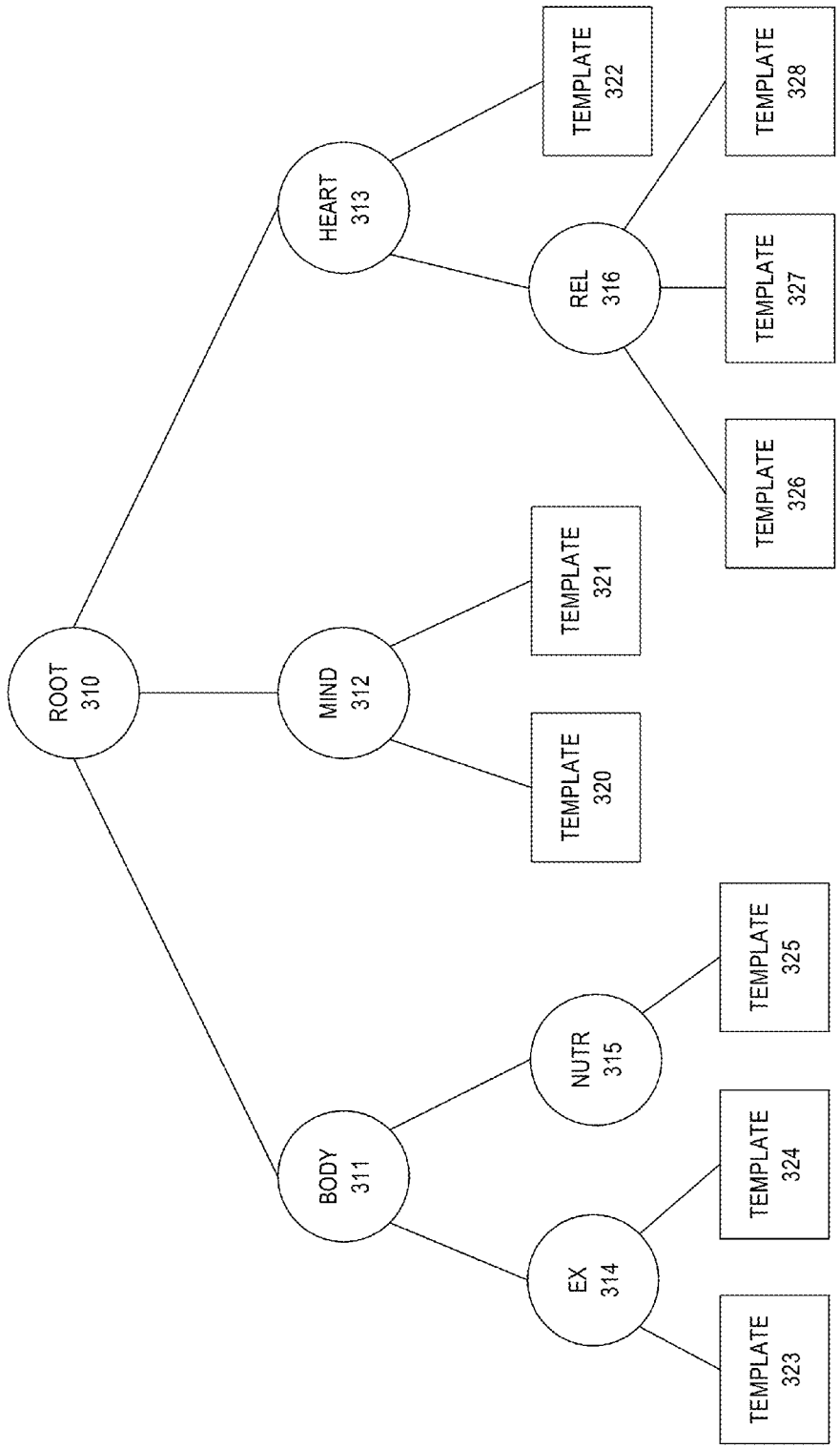
FIG. 3 illustrates a diagram depicting an example template hierarchy in an embodiment.

FIG. 3 illustrates a diagram depicting an example template hierarchy in an embodiment. A template hierarchy having, as nodes, trend categories and templates, may be constructed by a user in an embodiment. For example, template hierarchy 300 includes the following trend categories: root 310, body 311, mind 312, heart 313, exercise 314, nutrition 315, and relationships 316. Template hierarchy 300 also includes templates 320-328. In an embodiment, template nodes are not children of other template nodes, but trend category nodes may be children of other trend category nodes.

A user may place templates into categories in order to generate a composite report for that category. For example, the template associated with template node 323 may be a template that defines an analysis strategy associated with cardiovascular exercise performed by the user. Such a template may be reliant on events generated by exercise machines such as elliptical runners, exercise bicycles, and treadmills. The template associated with template node 324 may define a strategy for reporting weight training exercises. This template may be reliant on manually entered events or events generated by electronic weight-lifting machines. Each of these templates are related to exercise, and thus may be placed under the exercise trend category 323. In an embodiment, templates may be placed in multiple trend categories.

Each template includes instructions for generating a success score associated with that template. A trend category metric is generated for each category based on the success scores associated with its child nodes. In an embodiment, a weight is defined for each child node at the parent node. For example, for exercise node 314, the user may assign a weight of 60% to template node 323 and a weight of 40% to template node 324. Thus, the score of template 323 has a more significant effect on the trend category metric for exercise 314. A template that is assigned to multiple categories may contribute different metrics or different weights to each category with which it is associated.

Exercise and nutrition are both concepts related to the human body. Thus, exercise node 314 and nutrition node 315 are child nodes of body node 311, and each are assigned a weight with respect to body node 311. For example, for body node 311, the user may assign a weight of 45% to exercise node 314 and a weight of 55% to nutrition node 315.

The embodiment shown in FIG. 3 divides the hierarchy into three main categories: body 311, mind 312, and heart 313. A large portion of the data people track about themselves may fall into one of these three categories, and generating a composite score for each of these categories allows users to determine if any of these categories is off-balance. For example, if a user receives a composite score of 90 out of a possible 100 points for each of body node 311 and mind node 312, but a composite score of 30 out of a possible 100 points for heart node 313, that user will be alerted to the possibility that he needs to focus on his relationship-building activities. For example, the template associated with template node 326 may track calls that the user has made to the people in his "favorites" list on his mobile phone. The user may recognize this deficiency by looking for low scores in his hierarchy. In an embodiment, a hierarchy visualization interface may visually indicate low-performing nodes by highlighting them or displaying them using a particular color, such as red. High-performing nodes may be displayed in green, while nodes in danger of failing, or with a trend toward failure may be displayed in yellow or orange.

Social Trending

In an embodiment, users may share event information, output associated with particular templates, and trend hierarchy information with one another. Users share information based on the type of events associated with the particular events, the data collection device used to collect the particular events, the data collection device type of the data collection device used to collect the particular events, a template that includes one or more data analysis strategies used to generate the particular events, or the time at which the particular events were stored.

A user may send a request to associate a data collection device with his profile. The user may then request that some, or all, of the events associated with the data collection device be made available to another user. For example, the user may request that all location events be shared with the second user. The user may also request that all events occurring within a specific range of time, or events associated with a particular template be shared with the second user. Users may also explicitly exclude sharing of events associated with a particular device.

In an embodiment, a first user can alter the data associated with a second user. For example, a template may require user input associated with another person. This may be particularly true with templates that track relationship-related event, such as how often a husband and wife go on a date with one another. If the husband forgets to track the date, the wife may choose to manually enter the event on his behalf, if such access is granted to her.

Users may connect to other users within the system, and create sharing preferences based on association groups or degrees of separation. Friends may also be part of a shared trend hierarchy or trend group. These users may be tracking the same information, and have the same devices. A group goal may be set, with each user representing a node in the trend hierarchy. A group manager may set weights associated with each user, and may override weights set by individuals for the purpose of that hierarchy. This allows a member of the group hierarchy to track his own performance using one weighting strategy while the group manager can create a group-specific weighting strategy. This may be particularly useful when each user contributes more than one node to the group hierarchy.

Example Method

In an embodiment, a request is received to associate a first template with a first user. The template includes instructions that define one or more data analysis strategies. Data associated with a data collection device is received. This data includes one or more events associated with the first user. The data also includes one or more time stamps that are associated with the events. For example, the data may include location events that state the latitude and longitude of the data collection device at a particular time. Based on a strategy defined in the template and the data received from the data collection device, a result that conveys information relating to one or more trends involving the events is generated. For example, a bar chart that compares time spent at a first location with time spent at a second location may be generated.

In an embodiment, the template includes user-customizable parameters. For example, a user may define the latitude and longitude associated with the first location. That location may be expanded by defining a perimeter. For example, the amount of time spent at the first location may be based on the location events that occurred within 50 meters of that location.

In an embodiment, a second set of events and timestamps associated with the user are received. Some of the first events, such as location events, are matched with some of the second events, such as events that track a user's heart rate, based on the time stamps associated with the events. For example, the user may have been at the first location for a first period of time. The heart rate events that occurred during the same period of time are considered "matching" events, even if no two events have identical time stamps. Based on this information, a report may be generated that shows the user's heart rate while the user is at a particular location, even if the heart-rate monitor is not location-aware.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
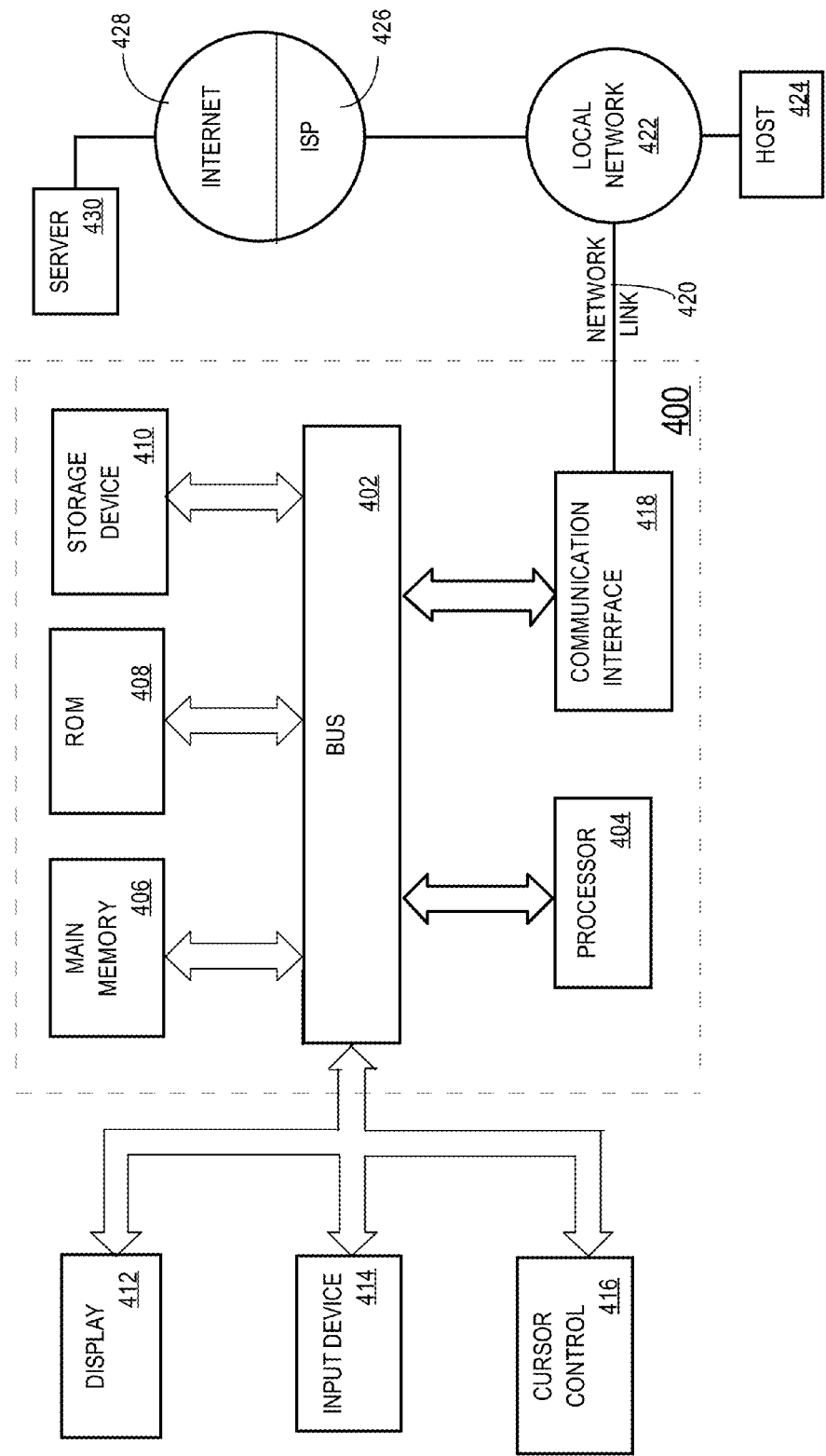
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   receiving a request to associate a first template with a first user, wherein templates include instructions that define one or more data analysis strategies;
   receiving first data associated with a first data collection device, wherein the first data includes:
   a) one or more first events associated with the first user; and
   b) one or more first time stamps, wherein each of the one or more first time stamps is associated with at least one of the one or more first events;
   based on a first data analysis strategy defined by instructions stored in the first template and the first data, generating a first result that conveys information relating to one or more trends involving the one or more first events;
   receiving a request to associate a second template with the first user;
   receiving second data, wherein the second data includes:
   a) one or more second events associated with the first user, wherein each of the one or more second events is a different type of event than the one or more first events; and
   b) one or more second time stamps, wherein each of the one or more second time stamps is associated with at least one of the one or more second events;
   based at least in part on the second data and a second data analysis strategy defined by instructions stored in the second template, generating a second result that conveys information relating to one or more trends involving the one or more second events;
   receiving, from the first user, input that defines a composite reporting strategy, wherein the composite reporting strategy includes: a) relationships between templates and trend categories in a first trend hierarchy; and b) weight metrics associated with one or more templates included in the composite reporting strategy;
   wherein trend categories represent nodes for organizing templates in a template hierarchy;
   generating a composite report that includes a trend category metric for each trend category included in the composite reporting strategy based at least in part on the composite reporting strategy, wherein the one or more strategies defined in each template included in the strategy is factored into one or more trend category metrics for one or more related trend categories, wherein the degree to which the strategy of each template is reflected in a trend category metric is based at least in part on the weight metric associated with that template in the composite reporting strategy;

wherein the composite report is based at least in part on the first result and the second result;

wherein the method is performed by one or more computing devices.

2. The method of claim 1, further comprising:

determining that the first template is a first child of a first trend category in the first trend hierarchy;

determining that the second template is a second child of the first trend category;

generating a first trend category metric for the first trend category based at least in part on: a) a first template metric that is generated in accordance with the first data analysis strategy, b) a second template metric that is generated in accordance with the second data analysis strategy, and c) a first weight metric associated with the first template;

based at least in part on the first trend category metric and a second trend category metric, generating a composite report.

3. A computer-readable non-transitory storage medium storing instructions, which, when executed by one or more processors, cause the one or more processors to perform:

receiving a request to associate a first template with a first user, wherein templates include instructions that define one or more data analysis strategies;

receiving first data associated with a first data collection device, wherein the first data includes:
 a) one or more first events associated with the first user; and
 b) one or more first time stamps, wherein each of the one or more first time stamps is associated with at least one of the one or more first events;

based on a first data analysis strategy defined by instructions stored in the first template and the first data, generating a first result that conveys information relating to one or more trends involving the one or more first events;

receiving a request to associate a second template with the first user;

receiving second data, wherein the second data includes:
 a) one or more second events associated with the first user, wherein each of the one or more second events is a different type of event than the one or more first events; and
 b) one or more second time stamps, wherein each of the one or more second time stamps is associated with at least one of the one or more second events;

based at least in part on the second data and a second data analysis strategy defined by instructions stored in the second template, generating a second result that conveys information relating to one or more trends involving the one or more second events;

receiving, from the first user, input that defines a composite reporting strategy, wherein the composite reporting strategy includes: a) relationships between templates and trend categories in a first trend hierarchy; and b) weight metrics associated with one or more templates included in the composite reporting strategy;

wherein trend categories represent nodes for organizing templates in a template hierarchy;

generating a composite report that includes a trend category metric for each trend category included in the composite reporting strategy based at least in part on the composite reporting strategy, wherein the one or more strategies defined in each template included in the strategy is factored into one or more trend category metrics for one or more related trend categories, wherein the degree to which the strategy of each template is reflected in a trend category metric is based at least in part on the weight metric associated with that template in the composite reporting strategy;

wherein the composite report is based at least in part on the first result and the second result.

4. The computer-readable non-transitory storage medium of claim 3, wherein the instructions further include instructions for:

determining that the first template is a first child of a first trend category in the first trend hierarchy;

determining that the second template is a second child of the first trend category;

generating a first trend category metric for the first trend category based at least in part on: a) a first template metric that is generated in accordance with the first data analysis strategy, b) a second template metric that is generated in accordance with the second data analysis strategy, and c) a first weight metric associated with the first template;

based at least in part on the first trend category metric and a second trend category metric, generating a composite report.

* * * * *